United States Patent
Fujita et al.

(10) Patent No.: US 6,185,068 B1
(45) Date of Patent: Feb. 6, 2001

(54) THIN-FILM MAGNETIC HEAD WITH A COIL HAVING A TRAPEZOIDAL CROSSSECTION

(75) Inventors: Kiyoharu Fujita; Takeo Sasaki; Shinji Furuichi, all of Mohka (JP)

(73) Assignee: Hitachi Metals, Ltd., Tokyo (JP)

( * ) Notice: Under 35 U.S.C. 154(b), the term of this patent shall be extended for 0 days.

(21) Appl. No.: 09/343,225

(22) Filed: Jun. 30, 1999

(30) Foreign Application Priority Data

Jul. 10, 1998 (JP) .................................................. 10-195682

(51) Int. Cl.[7] ........................................................ G11B 5/17

(52) U.S. Cl. ................................................................ 360/123

(58) Field of Search ...................................... 360/123, 126

(56) References Cited

U.S. PATENT DOCUMENTS

| | | |
|---|---|---|
| 4,751,599 | 6/1988 | Katou . |
| 5,065,270 | 11/1991 | Koyanagi et al. . |
| 5,734,534 * | 3/1998 | Yamamoto ............................ 360/123 |

* cited by examiner

*Primary Examiner*—A. J. Heinz

(57) ABSTRACT

A coil construction of a thin film magnetic head that can be manufactured with high yields without forming cavities between the coil layers while preventing short-circuiting between the upper magnetic pole and the coil layers is disclosed. The thin film magnetic head has a recording gap layer provided at the tips of film-shaped lower and upper magnetic poles magnetically connected in the rear portion thereof, and one or more coil layers wound around the rear portion; the coil layers having a convexedly curved upper surface and sides whose inclination angle $\theta$ is within the range of 80° to 90°.

10 Claims, 4 Drawing Sheets

THIN-FILM MAGNETIC HEAD WITH A COIL HAVING A TRAPEZOIDAL CROSSSECTION

BACKGROUND OF THE INVENTION

1. Field of the Invention

This invention relates generally to a thin-film magnetic head used for recording and reproducing information in magnetic disk units, and more particularly to a thin film magnetic head comprising a lower magnetic core and an upper magnetic core disposed facing each other via a non-magnetic thin film serving as a magnetic gap, and thin film coils wound between the upper and lower magnetic cores, in which thin film conductors constituting the thin film coils have a cross-section of such a shape that an insulating resin is easy to fill in the space between the conductors.

2. Description of the Related Art

A separate recording/reproduction type magnetic head comprises a magneto-resistive head and an inductive head laminated on a non-magnetic substrate 101 made of a material, such as alumina/titanium carbide, as shown in the perspective view of FIG. 3. The separate recording/reproduction magnetic head which is manufactured with thin film technology is often called as "thin film magnetic head" as a whole. The inductive head has also heretofore been called the "thin film magnetic head," as against the magneto-resistive head. In this Specification, therefore, the term "thin film magnetic head" is used as referring to the "separate recording/reproduction type magnetic head" and/or the "inductive head."

In FIG. 3, a thin film magnetic head has on a non-magnetic substrate 101 an alumina layer 111, a lower shield 102, a magneto-resistive element 103, a magnetic film 105 serving as an upper shield and a lower magnetic core (hereinafter referred to as "lower magnetic core"), and an upper magnetic core 107. In the figure, an insulating film for insulating between the lower shield, the magneto-resistive element and the upper shield is omitted. As shown in FIG. 4 illustrating the longitudinal section of the head shown in FIG. 3 in the gap depth direction, the head has a non-magnetic thin film 115 comprising alumina, etc. between the lower magnetic core 105 and the upper magnetic core 107. The non-magnetic thin film 115 serves as a magnetic gap, through which opposing ends of both magnetic films form magnetic poles 105' and 107' of the thin film magnetic head.

An exciting coil 106, 106' is wound between the lower magnetic core 105 and the upper magnetic core 107. A thin film coil is used as the exciting coil, with the number of turns of this coil being normally 10 to 15 turns to maintain the magnetic and electric conversion characteristics between the upper and lower magnetic cores and the coil. In order to reduce the inductance of the head by reducing the space occupied by the coil between the upper and lower magnetic cores, it has been commonly practiced to dispose the thin film coil in multiple, normally two, layers. A non-magnetic insulating resin layer is provided between the thin film conductors of the coil to insulate between the thin film conductors, and between the thin film conductors and the magnetic cores. FIG. 4 is a cross-sectional view of the one having thin film coils arranged in two layers. As shown in the figure, an insulating resin layer 116 is formed on a non-magnetic thin film 115 deposited on a lower magnetic core 105. Since the non-magnetic thin film 115, made of alumina, etc., serves as a magnetic gap for the thin film magnetic head between both magnetic cores, the thickness thereof is as thin as 0.3 to 0.4 $\mu$m, about the length of the magnetic gap. The insulating resin layer 116, however, is required to have a certain thickness, about 1.5 to 2.5 $\mu$m, for example, because the shoulder of the magnetic pole 107' at the end of the upper magnetic core 107 rests on part of the insulating resin layer 43, defining the apex of the magnetic head.

Thin film conductors of the bottom-layer thin film coil 106 are arranged in parallel with each other on the insulating resin layer 116. Another insulating resin layer 117 is provided in such a manner as to enclose the lowermost-layer thin film coil 106. Thin film conductors of the upper-layer thin film coil 106' are formed in parallel with each other on the insulating resin layer 117, and still another insulating resin layer 118 is provided in such a manner as to enclose the upper-layer thin film coil 106'. On the insulating resin layer 118 formed is an upper magnetic core 107. A magnetic path for the thin film magnetic head is formed through the upper and lower magnetic cores 107 and 105. And, numeral 119 presents a filler material, such as alumina.

In the following, the manufacturing method will be described. Thin film coils for the thin film magnetic heads are manufactured by copper plating. A conductive film is deposited by sputtering a conductive material, such as copper, on a non-magnetic thin film 115, made of alumina, and an insulating resin layer 116 laminated on the lower magnetic core. Next, a photoresist film is applied to the surface of the conductive film and baked at a predetermined temperature. A photomask is positioned and aligned on the photoresist film, which is exposed, developed and rinsed with water. With this, a photoresist pattern matching the shape of the thin film coil is formed. Next, coil conductors are deposited by plating using a plating solution, such as copper sulfate. After the photoresist film has been stripped, the conductive film between the coil conductors is removed by ion milling to complete a helical coil 106. Photoresist is poured on this coil in such a manner as to enclose the coil, and heated for cure at about 270° C. to form an insulating resin layer. In order to form a multi-layer coil, this process is repeated.

With the ongoing trend toward higher recording density in the field of magnetic recording, the size of thin film magnetic heads is being increasingly miniaturized. The portions that can be miniaturized include intervals between coil layers, between the upper magnetic core and the coil, or between adjoining coil conductors (usually referred to as coil pitches). Reducing coil pitches, however, would make it difficult to fill the spaces between coil conductors with insulating resin. In particular, when the height of the thin film conductors is larger than the width thereof, or when the cross-sectional shape of the thin film resin is of an inverted trapezoidal shape, it could be difficult to completely fill the spaces between the thin film conductors with insulating resin, often causing cavities. Subjecting thin film magnetic heads with cavities to heat treatment and other subsequent processes could result in shrinkage of insulating resin in the vicinity of the cavities, leading to distortions of conductors and magnetic cores. FIG. 4 is a cross-sectional view of a thin film magnetic head of such a type, in which a cavity 120 tends to be caused on the conductor side surface. Even with the upper surface of the conductors being convexedly curved, if the inclination of the conductor side surfaces is larger than 90°, the conductive film near the conductor side surfaces tends to be left unremoved when the conductive film is removed by ion milling. This is attributable to the fact that part of the upper surface of the conductor acts as an umbrella, preventing ion particles from impinging on an area near the conductor side surface. The presence of part of the conductive film left unremoved near the side surface could readily cause an electrical short-circuiting in the adjoining conductors. A current leak in these areas could cause the resistance and inductance of the coils to change, resulting in changes in the size of recording magnetic field to be produced on magnetic poles.

To reduce the spaces between the coils and the upper magnetic core, it is a common practice to reduce the thickness of the insulating resin layer deposited on the coil layer. In doing so, however, the thickness of the insulating resin layer tends to become thinner on the upper edges of the thin film conductors of the coils, causing a short-circuiting between the upper magnetic core and the thin film conductors. The term upper edges of the thin film conductors used here refers to corner portions on the upper surface of the thin film conductors, or portions near the boundary between the upper surface and the side surface. When a photoresist of a low viscosity is used to completely fill the space between the thin film conductors, the photoresist formed tends to become thinner at the upper edges of the thin film conductors. Using a photoresist of a higher viscosity to a sufficiently thick insulating resin layer to cover the upper surface of the thin film conductors, on the other hand, could lead to an incomplete penetration of the photoresist into the space bottom between the thin film conductors, causing cavities. These defects, if produced, could lower yields in the manufacture of thin film magnetic heads.

SUMMARY OF THE INVENTION

It is an object of the present invention to provide a thin film magnetic head having coils that can ensure insulation between layers and insulation between coil conductors even after miniaturized.

A thin film magnetic head according to the present invention comprises a lower magnetic core and an upper magnetic core provided via a non-magnetic thin film that serves as a magnetic gap, and at least one layer of thin film coil insulated by an insulating resin layer that covers the thin film coil between these magnetic cores. The thin film coil consists of thin film conductors wound on the magnetic core. One end each of the lower and upper magnetic cores is disposed facing each other via a magnetic gap, serving as a recording magnetic pole. The lower and upper magnetic cores have a mutually connected portion on an area other than the respective magnetic poles thereof; forming a magnetic path running from one magnetic pole, passing through the magnetic core having that magnetic pole, via the mutually connected portion, passing through the other magnetic core, to the other magnetic pole on the other magnetic core.

Among the thin film coil, the thin film conductors constituting at least the lowermost coil layer that is closest to the lower magnetic core have a trapezoidal cross section that tapers off from the lower magnetic core upward, with the sides of the trapezoidal conductor inclined 80 to 90 degrees inward with respect to the upper surface of the lower magnetic core, and the upper surface of the thin film conductor curved convexedly.

The thin film magnetic head according to the present invention may comprise a plurality of layers of thin film coils comprising layers of thin film conductors wound on the magnetic core. The thin film conductors have a trapezoidal cross section that tapers off from the portion near the lower magnetic core upward, with the sides of the trapezoidal conductors inclined 80 to 90° inward with respect to the upper surface of the lower magnetic core.

In the thin film magnetic head according to the present invention, thin film conductors constituting the thin film coils may have a trapezoidal portion that tapers off from the lower magnetic core (from the portion near the lower magnetic core) upward, and a convexedly curved portion above the trapezoidal portion. The sides of the trapezoidal portion are inclined 80 to 90° inward with respect to the upper surface of the lower magnetic core.

Although the thin film magnetic head according to the present invention has thin film conductors having a trapezoidal cross section and a convexedly curved upper surface, the entire coils wound on the magnetic core need not have such a geometry. 50 to 100% of the wound coil, excluding the portions connecting coil layers and pad portions at coil ends, should preferably have the thin film conductors with the aforementioned cross section.

In the present invention, spaces between the thin film conductors can be fully filled with insulating resin because the conductors have a trapezoidal cross section the sides of which are 80 to 90° inward. With thin film conductors having sides inclined less than 80 degrees, the cross-sectional area of the conductor is reduced, resulting in increased coil resistance. The base of the conductor must therefore be increased to keep coil resistance at a low level. Making the cross section of thin film conductors of a trapezoidal shape with the sides thereof inclined 85 to 90° inward is more preferable in order to reduce coil pitches to achieve head miniaturization.

In the thin film magnetic head according to the present invention, a continuous transition should preferably be maintained from the sides of the trapezoidal portion to the convexedly curved upper surface. In this context, "continuous transition" means, in mathematics terms, an agreement between a tangential line on the side (a straight line connecting a given point on the boundary with a point on the side near that point, that is, a straight line obtained when that point on the side is infinitely approached to the point on the boundary) and a tangential line on the upper surface (a straight line connecting the point on the boundary with a point on the upper surface near the point, that is, a straight line obtained when that point on the upper surface is infinitely approached to the point on the boundary), but such strictness is not required for practical articles. It is suffice to define the term as "the upper and side surfaces smoothly blending together without projections, edges or corners."

Maintaining a continuous transition from the side surface to the upper surface of the conductors in this way helps prevent the insulating resin layer from being locally thinned out even by the use of a photoresist of a low viscosity since no shade portions are formed in the vicinity of the boundary between the upper and side surfaces, and as a result, insulating resin is allowed to flow along the surface, preventing the formation of cavities.

In the thin film conductors, a ratio (A/B) of the height A of the convexedly curved upper surface and the thickness B of the conductors should preferably be set to 1/20 to 1/3. That is, if the ratio of A/B is less than 1/20, the boundary between the upper and side surfaces of the thin film conductors becomes of an edge shape. The "edge-shaped boundary" means a construction which substantially acts as an edge or edge line, causing the adjacent insulating film to be thinned out. In other words, the insulating resin layer tends to be thinned out around the edge-shaped boundary in a construction where the distances between the upper magnetic core and the coil layers are small. If the ratio of A/B is larger than 1/3, on the other hand, the central portion of the upper surface of the thin film conductors protrudes too much, causing the insulating resin film layer to be thinned out at that portion. The locally thinned-out insulating resin layer could cause inconveniences, such as the puncture of the protective resin layer and current leaks. For these reasons, the ratio of A/B is desired to be kept with the aforementioned range. By improving the construction of the coil layer in the above-mentioned manner, the insulting resin layer of a uniform and sufficient thickness can be disposed between the coil layer and the upper magnetic pole.

The thickness of the insulating resin layer should preferably be 1 to 3 μm. The thickness of the insulating resin layer exceeding 3 μm would increase the distance between the two magnetic cores, and accordingly the length of the magnetic path and inductance, making the thin film magnetic head unsuitable for high-density magnetic recording. To maintain the dielectric resistance between the coil and the magnetic core, on the other hand, the thickness of the insulating resin layer should be more than 1 μm.

BRIEF DESCRIPTION OF THE DRAWINGS

These and other features and objects of this invention will become apparent to one skilled in the art from the following detailed description and the accompanying drawings illustrating features of this invention by way of example, wherein.

DESCRIPTION OF THE PREFERRED EMBODIMENTS

Figure 1:
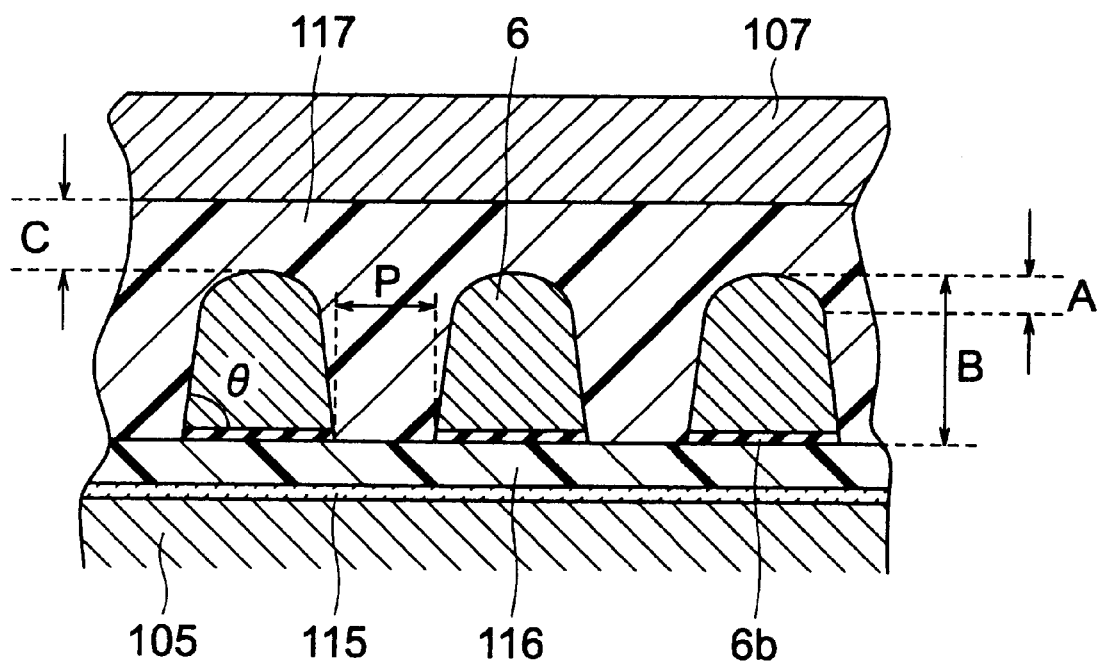
FIG. 1 is a cross-sectional view of a thin film magnetic head embodying the present invention.

Referring now to the drawings wherein like reference numerals are used to identify identical components in the various views, the preferred embodiments of this invention will be described in greater detail.

Figure 2:
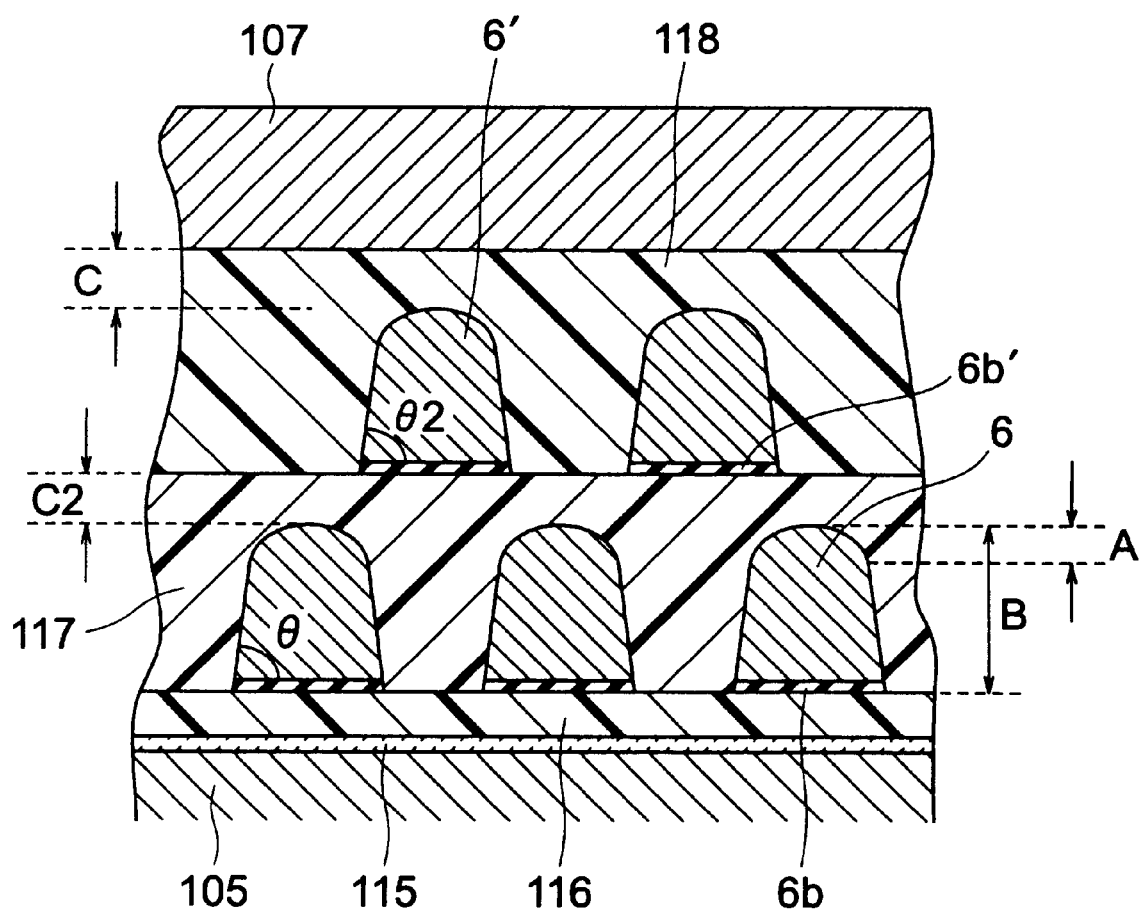
FIG. 2 is a cross-sectional view of a thin film magnetic head embodying the present invention.
Figure 3:
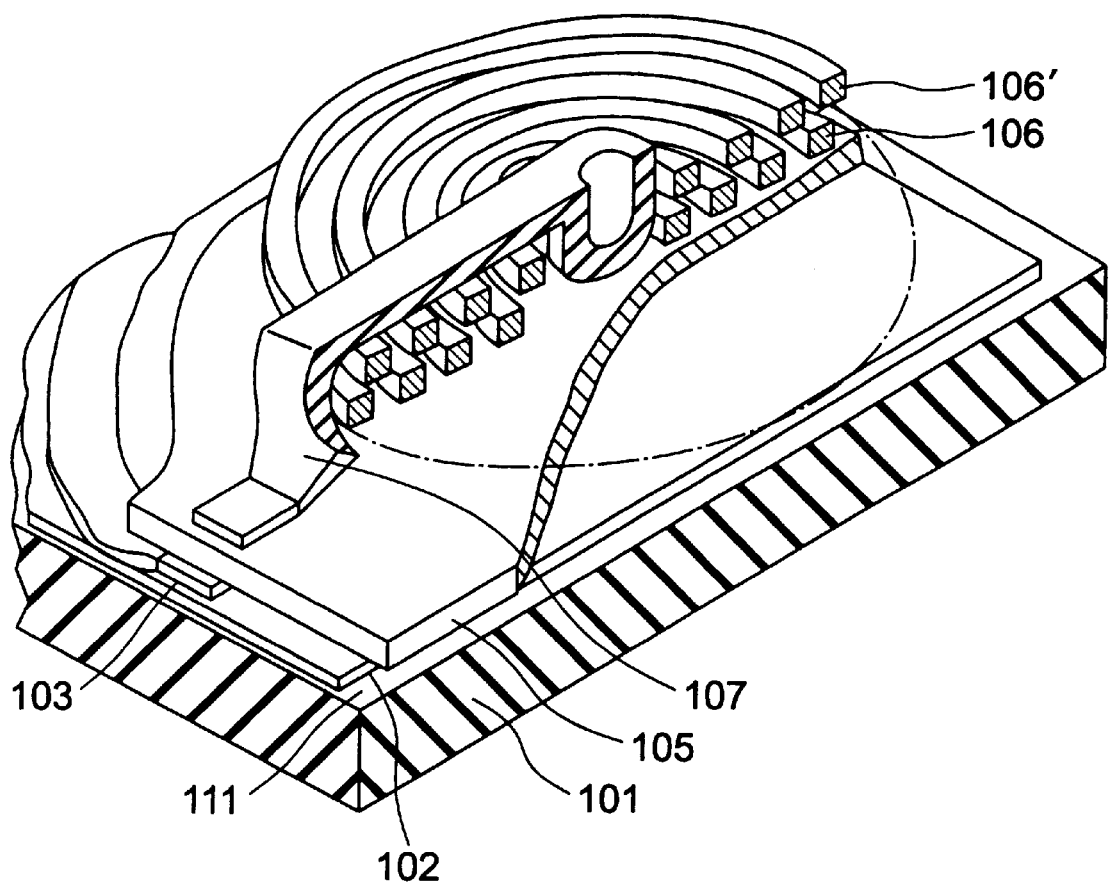
FIG. 3 is a partially cross-sectional perspective view of a conventional type of thin film magnetic head.
Figure 4:
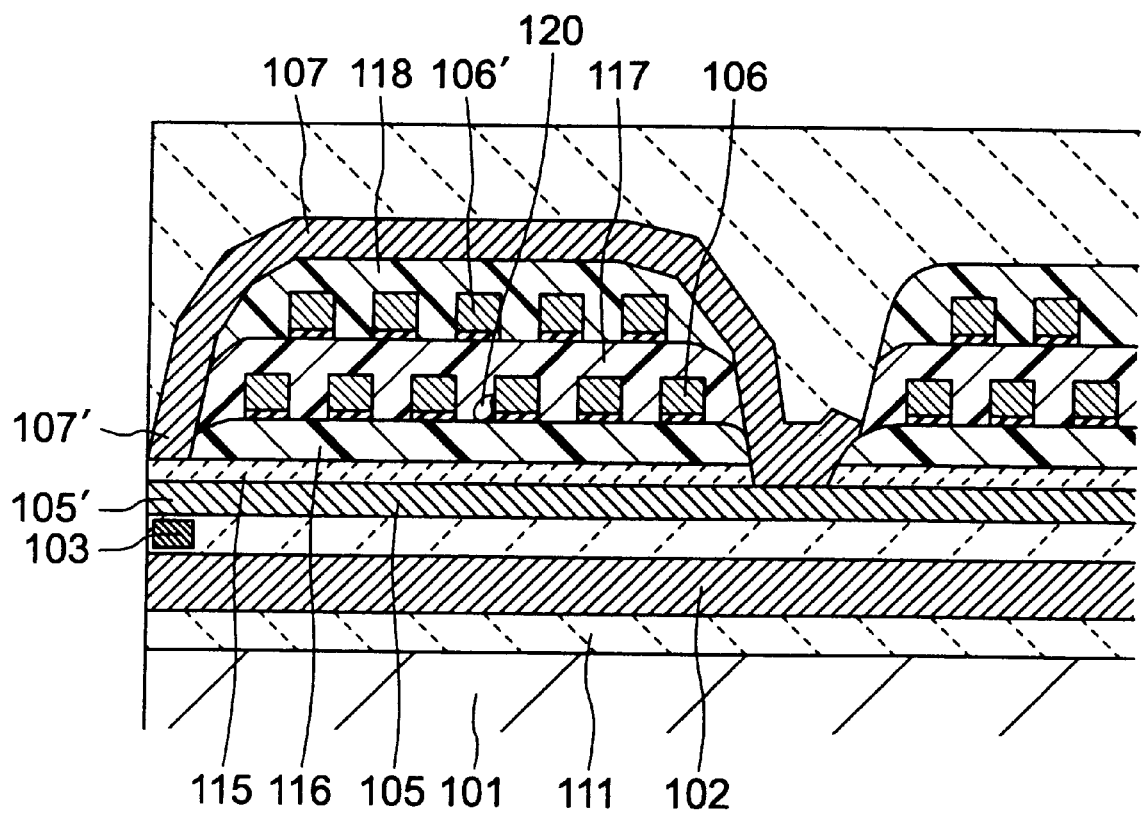
FIG. 4 is a cross-sectional view of a conventional type of thin film magnetic head.

In FIGS. 1 and 2, which are cross-sectional views of a thin film magnetic head according to the present invention, the general construction of the thin film magnetic head is substantially the same as the conventional type of the thin film magnetic head, as shown in FIGS. 3 and 4, comprising a recording mechanism including at least an upper magnetic pole, coil layer and lower magnetic pole, a reproducing mechanism including an MR film, and a substrate. Now, the present invention will be described, referring to the thin film magnetic head shown in FIG. 1. A thin film conductor of a coil 6 (including a conductive film 6b) is formed on a lower magnetic core 105 via a gap material 115 and an insulating resin layer 116. Another insulating resin layer 117 is provided in such a manner as to enclose the thin film conductor 6. The thin film conductor 6 has a cross section having on the lower part a trapezoidal portion tapering off upward, and a convexedly curved portion on the upper part; the sides of the trapezoidal portion inclined inward by an angle θ with respect to the lower magnetic core, and the convexedly curved portion having a convexedly curved surface. A continuous and smooth transition is maintained between the sides of the trapezoidal portion and the convexedly curved upper surface. The ratio (A/B) between the height A of the convexedly curved upper surface and the thickness B is (A/B)=0.25, and the inclination angle θ of the sides of the trapezoidal portion is θ=85°. The distance C between the upper surface of the coil layer and the upper magnetic core is 2.0 μm, with the coil pitch=2.2 μm, the conductor thickness B=3.5 μm, and the conductor width (width of the base of the trapezoidal portion)=2.5 μm. By adopting the construction of the present invention, spaces between the thin film conductors are completely filled with photoresist and the insulating resin layer 117 is prevented from being locally thinned out. Thus, the present invention is more suitable for miniaturization of thin film magnetic heads than the prior art since the coil pitch can be reduced with the present invention.

Now, the manufacturing method of the coil layer 6 shown in FIG. 1 will be described. A conductive film 6b made of copper was formed on the insulating resin layer 116 laminated on the lower magnetic core 105. A photoresist film was applied to the surface of the conductive film 6b, and baked at a predetermined temperature. A photomask was aligned on the photoresist film, which was then exposed. During exposure, the focus of exposure was adjusted so that the cross-sectional shape of the photoresist pattern became an inverted trapezoid. Then, the photoresist film was developed and rinsed with water. With this process, a photoresist pattern having an inverted trapezoidal cross-sectional shape was formed. Next, coils were formed by plating on the photoresist pattern. A solution prepared by blending the following ingredients was used as a plating solution.

| | |
|---|---|
| Pentahydrate of copper sulfate (CuSO$_4$.5H$_2$O): | 40 to 80 g/l (e.g. 75 g/l), |
| Sulfuric acid: | 30 to 150 ml/l (e.g. 120 ml/l), |
| Hydrochloric acid: | 40 to 80 ppm (e.g. 60 ppm), |

Brightener (EBARA-UDYLITE's brightener, Cu-BRITE TH): 1 ml/l.

A coil layer made of thin film conductors was obtained by plating the photoresist pattern for 5 to 10 minutes, with the plating solution temperature of 20 to 30° C. and the current density of 15 to 30 mA/cm$^2$. The Cu-BRIGHT TH used here is usually called the brightener or smoother because it is designed to refine the crystal grain size of the plating film and smooth the surface.

Adding the brightener has an effect of forming the upper surface of the thin film conductor into a convexedly curved surface. After the photoresist film was peeled off, the conductive film between the thin film conductors was removed to complete a helical coil. The removal of the conductive film can be performed not only with another dry process, such as RIE (reactive ion etching), but with a wet process. Photoresist was poured onto the coil layer in such a manner as to enclose the thin film conductors, and heated and cured at a temperature of about 270° C. to form an insulating resin layer. Next, an upper magnetic core 107 and a protective film were deposited on the insulating resin layer to form the thin film magnetic head.

If the photoresist film is exposed so that the cross section of the photoresist frame becomes a trapezoidal shape, on the other hand, the inclination angle θ formed by the sides of the thin film conductor of the coil layer becomes larger than 90°. When the conductive film is removed by ion milling in such a state, the conductive film near the sides of the thin film conductor is left unremoved. This is attributed to the fact that the convexedly curved surface of the thin film conductor serves as an umbrella, preventing ion particles from impinging on the conductive film near the sides of the thin film conductor. If the conductive film remains even locally, an electrical short-circuiting tends to occur between the adjoining conductors 6. Current leakage in these regions could change the resistance or inductance value of the coil layer, resulting in changes in the recording magnetic field strength generated on the magnetic poles.

To cope with this problem, yields were compared between a thin film magnetic head according to the present invention manufactured by the manufacturing process in the aforementioned embodiment and a thin film magnetic head of the conventional type where the cross-section of the thin film conductor is a rectangular shape with its longer sides disposed in an upright position. More specifically, 20 sets each of samples in which each of the average distance C between the coil layer and the upper magnetic core and the distance P between the adjoining thin film conductors was 1.0, 2.1, 2.8 and 3.9 $\mu$m were prepared, and a voltage was applied across the thin film conductors or across the thin film conductor and the upper magnetic core to compare the average values of their respective dielectric breakdown voltages. With the thin film magnetic heads having a trapezoidal cross-sectional shape according to the present invention, variability of insulating resin thickness and space distance was small and sufficient dielectric breakdown voltage was obtained with all 20 sets of samples, including those having even the C and P average values of 1.0 $\mu$m. With the conventional type of thin film magnetic heads, on the other hand, variability of C or P was great. With those samples where the average values of the coil pitch P were less than 2.8 $\mu$m, film thickness was locally thinned out too much. In 8 sets of samples, dielectric breakdown voltage fell sharply and cavities were caused near the bottom between the thin film conductors. Thus, miniaturization with the thin film magnetic heads of the conventional type would involve much time and trouble in inspection to eliminate samples having cavities, leading to decreased yields. With the thin film magnetic heads according to the present invention, yields do not lower even when C and P are within the range of 1.0 to 3.0 $\mu$m.

Now, another embodiment of the present invention will be described. FIG. 2 shows a thin film magnetic head according to the present invention where 2 coil layers are provided. The manufacturing process required for forming a first coil layer as the lowermost layer is the same as the embodiment shown in FIG. 1. In this embodiments, after the insulating resin layer 117 had been formed on the first coil layer, a conductor layer as a second (upper) coil layer was formed by sputtering. Next, a photoresist film was applied to the surface of the conductive film 6b' and baked at a predetermined temperature. A photomask was aligned on the photoresist film and exposed. The photomask was positioned so that the thin film conductors of the second coil layer are arranged between the thin film conductors of the first coil layer. During exposure, the focus of exposure was adjusted so that the cross section of the photoresist became an inverted trapezoidal shape. After that, the photoresist was subjected to developing and water rinsing processes. Thus, a photoresist pattern having an inverted trapezoidal cross-sectional shape was formed. Then, a coil layer was formed by plating on the photoresist pattern obtained. Next, an insulating resin layer 118 was formed on the second coil layer, and an upper magnetic core 107 was deposited on the insulating resin layer 118. The inclination angle $\theta 2$ of the sides of the thin film conductors of the second coil layer 6' was defined as an angle at which the sides of the thin film conductor inclines inward with respect to the flat upper surface of the lower magnetic core, as shown in the figure.

The first coil layer 6 and the second coil layer 6' were electrically connected directly to each other by wiring (not shown).

Dimensions of each portion of the construction shown in FIG. 2 are as follows: On the first coil layer, the inclination angle $\theta=80°$, the thickness B of the thin film conductors B=2.0 $\mu$m, (A/B)=0.25, and the width of the conductors=2.5 $\mu$m. The distance C2 between the first and second coil layers C2=2.2 $\mu$m, and the distance C between the second coil layer and the upper magnetic core C=1.8 $\mu$m. On the second coil layer, $\theta 2=88°$, the thickness B of the thin film conductors B=2.6 $\mu$m, (A/B)=0.2, and the width of the conductors=3.0 $\mu$m. In this embodiment, the magnetic path length of the upper and lower magnetic cores is shortened by providing two coil layers and reducing the number of turns of the coil in the direction of coil arrangement (horizontal direction in the figure). As a result, coil inductance is reduced and recording efficiency is improved, compared with the construction having a single coil layer. In this embodiment, moreover, increases in coil resistance are inhibited by limiting the lower limit of the inclination angle $\theta$ to 80°. This is because reducing the inclination angle $\theta$ down to 70° or 60° without changing the width of the bottom of the thin film conductors could reduce the cross-sectional area of the thin film conductors and increase the resistance of the coils.

When the thin film magnetic head of the aforementioned embodiments, which is adapted to cope with the miniaturization of magnetic poles, is installed in a hard disk drive having a narrow-track recording medium by combining with a reproducing element that can accommodate tracks as narrow as less than about 2 $\mu$m, crosstalk of reproducing signals can be reduced. The term crosstalk used here means, during the recording/reproduction of signals on and from a recording medium using a thin film magnetic head, the application of recording magnetic fields as signals to two adjacent recording tracks, or the reproduction of signals recorded on the adjacent two or more recording tracks.

Known narrow track-compatible reproducing elements include a spin valve element having an anti-ferromagnetic layer, a soft magnetic layer (pinned layer), a Cu spacer layer and a soft magnetic layer (free layer), and a TMR (tunnel magnetoresistive element) having an insulating spacer layer interposed between two soft magnetic layers. It is preferable to provide a thin film magnetic head by combining these reproducing elements with the coil construction according to the present invention.

By using the present invention, a thin film magnetic head having no cavities between thin film conductors of coils can be obtained. With the present invention, furthermore, thin film magnetic heads can be manufactured with high yields while preventing short-circuiting between the upper magnetic core and the coil layers.

While the invention has been particularly shown and described with reference to the preferred embodiments thereof, it is well understood by those skilled in the art that various changes and modifications can be made in the invention without departing from the spirit and scope of the invention.

What is claimed is:

1. A thin film magnetic head, having a lower magnetic core and an upper magnetic core disposed facing each other via a non-magnetic thin film serving as a magnetic gap, and
   at least one thin film coil layer insulated by an insulating resin layer between these magnetic gaps and comprising thin film conductors wound on the magnetic core;
   among those thin film coils, at least the thin film conductors constituting a lowermost layer near the lower magnetic core have a trapezoidal cross section that tapers off from the lower magnetic core upward, with the sides of the trapezoidal conductor inclined 80 to 90° inward with respect to the lower magnetic core, and the upper surface thereof curved convexedly.

2. A thin film magnetic head as set forth in claim 1, wherein a continuous transition is maintained from the sides of the trapezoidal conductor to the convexedly curved upper surface thereof.

3. A thin film magnetic head as set forth in claim 2, wherein the ratio (A/B) of the height A of the convexedly curved upper surface of the thin film conductor to the height B of the trapezoidal portion thereof is 1/20 to 1/3.

4. A thin film magnetic head as set forth in claim 3, wherein the thickness of the insulating resin layers between one of the thin film coil layers and another thin film coil layer and between the uppermost thin film coil layer and the upper magnetic core is 1 to 3 $\mu$m.

5. A thin film magnetic head as set forth in claim 2, wherein the thickness of the insulating resin layers between one of the thin film coil layers and another thin film coil layer and between the uppermost thin film coil layer and the upper magnetic core is 1 to 3 $\mu$m.

6. A thin film magnetic head, having a lower magnetic core and an upper magnetic core disposed facing each other via a non-magnetic thin film serving as a magnetic gap, and a plurality of thin film coil layers insulated by insulating resin layers between these magnetic gaps and comprising thin film conductors wound on the magnetic core and arranged in layers;

the thin film conductors have a trapezoidal cross section that tapers off from the lower magnetic core upward, with the sides of the trapezoidal conductor inclined 80 to 90° inward with respect to the lower magnetic core, and the upper surface thereof curved convexedly.

7. A thin film magnetic head as set forth in claim 6, wherein a continuous transition is maintained from the sides of the trapezoidal thin film conductors to the convexedly curved upper surface thereof.

8. A thin film magnetic head as set forth in claim 7, wherein the ratio (A/B) of the height A of the convexedly curved upper surface of the thin film conductor to the height B of the trapezoidal portion thereof is 1/20 to 1/3.

9. A thin film magnetic head as set forth in claim 8, wherein the thickness of the insulating resin layers between the thin film coil layers and between the uppermost thin film coil layer and the upper magnetic core is 1 to 3 $\mu$m.

10. A thin film magnetic head as set forth in claim 7, wherein the thickness of the insulating resin layers between the thin film coil layers and between the uppermost thin film coil layer and the upper magnetic core is 1 to 3 $\mu$m.

* * * * *